Patented July 27, 1943

UNITED STATES PATENT OFFICE 2,325,376

2,325,376

CONDENSATION PRODUCT OF AMIDOGEN COMPOUNDS, ALDEHYDES, AND KETO-ESTERS

Gaetano F. D'Alelio, Pittsfield, Mass., assignor to General Electric Company, a corporation of New York No Drawing. Application August 27, 1940, Serial No. 354,395

11 Claims. (Cl. 260—42)

This invention relates to the production of new materials, specifically condensation products, having valuable and characteristic properties that make them especially suitable for use in industry, for example in casting, molding, laminating, coating and adhesive applications, and for other purposes. The invention is concerned more particularly with compositions of matter comprising heat-convertible (heat-curable) aminoplasts internally modified (chemically united) with a keto-ester represented by the formula RCOCH$_2$COOR', where R and R' are hydrocarbon radicals. Examples of such esters are acetoacetic esters, for instance alkyl, aryl, alkaryl and aralkyl acetoacetates. The scope of the invention also includes products comprising the above-described aminoplasts in cured state.

As is well known, aminoplasts are synthetic resins prepared from amino or amido compounds (amidogen compounds), a typical example being urea-formaldehyde resin (reference: Modern Plastics, vol. 17, No. 2, October, 1939, page 433). Ordinarily aminoplasts must be plasticized prior to use, for example in the production of molding compositions, in order to obtain products of optimum commercial utility. Various esters and other organic substances heretofore have been used for this purpose. The prior plasticizers often have been volatile bodies that would volatilize during the process of molding the composition under heat and pressure. Or, if partially retained during molding, the plasticizer sometimes would sublime or volatilize from the finished product during service use, thereby causing strains, cracks or surface crazing in the completed article. The plasticizers usually have been non-reactive materials that could be extracted from the molded article, that is, substances incapable of chemically tying in with the aminoplast (or the components thereof) to become an integral part of the resin molecule.

In the production of aminoplasts it also has been common practice to incorporate into the condensation product or into the molding composition a latent or an active (direct) curing catalyst in order to accelerate the curing of the soluble, fusible aminoplast to an insoluble, infusible state. This method of accelerating the curing of aminoplasts has not always been entirely satisfactory.

I have discovered that internally plasticized aminoplasts can be prepared by effecting reaction between the components of a mass comprising (1) an amino or an amido compound, e. g., aminotriazines, for instance diaminotriazines such as ammeline, triaminotriazines such as melamine, etc., urea, thiourea, etc. (or mixtures thereof), (2) an aliphatic aldehyde, e. g., formaldehyde, and (3) a keto-ester corresponding to the formula RCOCH$_2$COOR', where R and R' are the same or different hydrocarbon radicals. I have also surprisingly found that compositions comprising a soluble, fusible condensation product of a plurality of compounds including an amino or an amido compound, an aliphatic aldehyde and a keto-ester of the above-defined class are convertible under heat (more particularly at molding temperatures) to an insoluble, infusible state. The present invention thus provides potentially reactive (heat-convertible), internally plasticized aminoplasts and molding compositions that require no additional plasticizer and no curing accelerator of the admixed-catalyst type, or other curing reactant, in order to obtain technically useful products. In such aminoplasts, which may be termed "self-curing aminoplasts," the whole resin molecule including the curing reactant that is an integral part thereof cures (hardens) to an insoluble, infusible state.

Ordinarily when an acetoacetic ester is caused to react with formaldehyde by the known technique, a distinct oily phase separates from the reaction mass. When the reaction is carried out under the catalytic conditions commonly employed in the preparation of the usual aminoplasts, an almost instantaneous reaction takes place. It was wholly unexpected and unpredictable, therefore, to find that a keto-ester of the kind with which this invention is concerned could be intercondensed with an aliphatic aldehyde, specifically formaldehyde, and an amino or an amido compound to obtain a uniform, homogeneous, heat-convertible, resinous reaction product possessing a plasticizing body as a permanent and integral part of the resin molecule.

The resin syrups and molding compositions of this invention may be stored for long periods of time without material alteration. In marked contrast the prior heat-convertible aminoplasts, more particularly those containing direct or active curing catalysts such as acids, e. g., hydrochloric, ethyl sulfuric, phthalic, chloracetic, phosphoric, etc., often lacked time or storage stability. The heat-hardenable molding compositions of this invention cure rapidly under heat or under heat and pressure and have good plastic flow during molding. Hence molded articles of even the most complicated designs can be produced rapidly and economically. The cured (heat-hardened) products have good light stability, excellent water resistance and surface finish and, in general, meet the strength, hardness and other requirements of the particular service application.

Another advantage accruing from my invention is that by the use of selected keto-esters of the defined class, more particularly those containing at least six carbon atoms in the alcohol residue of the ester radical, e. g., hexyl, heptyl, octyl, decyl, dodecyl, etc., acetoacetates, the single ester imparts plasticizing, water-repelling, mold-lubricating and curing properties to the resinous body and to molding, laminating, adhesive or other compositions prepared therefrom.

In producing my new condensation products, which may be described more specifically as co-condensation or inter-condensation products, the choice of the aliphatic aldehyde component is dependent largely upon economic considerations and upon the particular properties desired in the finished product. I prefer to use as the aldehyde reactant formaldehyde or compounds engendering formaldehyde, e. g., paraformaldehyde, hexamethylene tetramine, etc. For some applications I may use, for instance, acetaldehyde, propionaldehyde, butyraldehyde, acrolein, methacrolein, crotonaldehyde, etc., mixtures thereof, or mixtures of formaldehyde (or compounds engendering formaldehyde) with such aliphatic aldehydes. In general, the longer the chain of the aliphatic aldehyde, the slower the cure of the resinous condensation product and the softer the final product.

The amido or amino component may be, for instance, urea, thiourea, diurea, diethylene triurea, methyl urea, acetyl urea, benzoyl urea, phenyl thiourea, asymmetrical diethyl urea, allyl urea, 2-chlorallyl urea, ethylidene urea, methylol urea, methylene urea, guanidine (iminourea), dicyandiamide, guanyl urea, guanylthiourea, biguanidine, aminoguanidine, creatinine, guanoline (guanido carbonic ethyl ester), etc. Suitable mixtures of such compounds also may be used. The terms "a urea" and "urea substance" as used generally herein and in the appended claims are intended to include within their meaning substances of the kind above mentioned. Other examples of aldehyde-reactable amidogen compounds that may be used are creatinine and aminotriazines (e. g., melamine, ammeline, etc.).

Any keto-ester having the general formula RCOCH$_2$COOR', where R and R' are the same or different hydrocarbon radicals may be employed. Thus R and R' may be the same or different alkyl, aryl, alkaryl, aralkyl, hydrocarbocyclic, alkenyl, etc., radicals. More specific examples of radicals which R and R' may be are methyl, ethyl, propyl, butyl, isobutyl, amyl, hexyl, octyl, decyl, allyl, methallyl, benzyl, phenethyl, tolyl, etc., radicals.

In producing these new compositions comprising a condensation product of a plurality of compounds including a urea, an aliphatic aldehyde and the above-defined keto-ester, the initial condensation may be carried out at normal or at elevated temperatures and in the presence or absence of an acid or an alkaline condensing agent or catalyst. Preferably the reaction between the components is started under alkaline conditions.

Any substance yielding an alkaline aqueous solution may be used in obtaining alkaline conditions for the initial condensation reaction. For example, I may use an alkali such as sodium, potassium and calcium hydroxides, sodium and potassium carbonates, also tri-amines, for instance tri-alkanol amines, e. g., tri-isopropanol amine, tri-alkyl amines, e. g., tri-methyl, tri-ethyl, tri-propyl, tri-isopropyl, tri-butyl, etc., amines, tri-aryl amines, e. g., tri-phenyl amine, tri-benzyl amine, etc. Advantageously I introduce into the reaction mass a nitrogen-containing compound selected from the class consisting of ammonia (which includes within its meaning an aqueous solution of ammonia, specifically ammonium hydroxide), monoamines and diamines. Such nitrogen-containing compounds may be described as alkaline methylol-forming reagents and condensing agents. They are capable of intercondensing with other components of the reaction mass, e. g., formaldehyde, or with products formed during the resin-forming reaction, e. g., methylol ureas. On the other hand, when tri-amines such as tri-alkyl and tri-aryl amines are employed they are, to the best of my knowledge and belief, incapable of intercondensing with the other components. Examples of monoamines and diamines are the mono- and di-alkyl amines, e. g., the mono- and di-methyl, -ethyl, -propyl, -isopropyl, -butyl, -amyl, etc., amines, the mono- and di-aryl amines, e. g., mono- and di-phenyl amines, mono- and di-benzyl amines, etc., the mono- and di-alkanol amines, e. g., mono- and di-ethanol amines, etc.

Various ways may be employed for effecting initial reaction between the components. For example, I may first mix all the reactants and effect simultaneous condensation between the mixed reactants in the presence or absence of addition agents, for instance condensation catalysts, fillers, other natural or synthetic resinous bodies, solvents, diluents, etc. Alternatively, I may add the keto-ester to a partial condensation product of a urea and an aliphatic aldehyde and effect further condensation between the components. Or, I may first condense the keto-ester with an aliphatic aldehyde, add the resulting product to a urea-aliphatic aldehyde partial condensation product and then cause the reaction to proceed further. Or, I may condense or partially condense the keto-ester with an excess of aliphatic aldehyde, add a urea to this condensation product and effect further reaction between the components. Still other ways may be employed in combining the components and in producing the unmodified or modified condensation products of this invention, as will be readily understood by those skilled in the art as the description of the invention proceeds. These condensation reactions may proceed under a variety of time, temperature and pressure conditions. The temperature of the reaction may vary from room temperature to the reflux temperature of the reactants at reduced, atmospheric or super-atmospheric pressures.

The products obtained as described above properly may be designated as intermediate condensation products. They are thermosetting resinous bodies which alone or mixed with fillers, pigments, accelerators, dyes, lubricants, etc., may be used, for example, as molding compositions. The modified or unmodified resinous masses are self-convertible at elevated temperatures to an insoluble, infusible (that is, cured) state.

These intermediate condensation products may be concentrated or diluted further by the removal or addition of volatile solvents to form liquid coating compositions of adjusted viscosity and concentration. The liquid compositions may be used, for instance, as surface-coating materials, in the production of paints, varnishes, lacquers, enamels, etc., for general adhesive applications, as anti-creasing agents, in the production of laminated articles and for numerous other purposes. The liquid intermediate condensation products also may be used directly as casting resins. Those intermediate products of a gel-like nature may be dried and granulated to form clear, unfilled, heat-convertible resins.

The following examples are given in order to illustrate more clearly how the present invention may be carried into effect. All parts are by weight.

EXAMPLE 1

*Resin syrup I*

| | Parts |
|---|---|
| Urea | 137.0 |
| Aqueous ammonia (approximately 28% NH₃) | 14.4 |
| Aqueous formaldehyde (approximately 37.1% HCHO) | 384.0 |
| Sodium hydroxide in 24 parts water | 0.096 |
| Ethyl acetoacetate | 13.2 |

The above components were mixed and heated under reflux for 30 minutes. At the end of this time the pH of the resinous syrup had dropped to 4.83. The solution of the intercondensation product obtained by chemical interaction of the components was clear and free from precipitate in spite of the pH condition. An ordinary aminoplast resin in the absence of the intercondensed keto-ester, under the same pH conditions, is precipitated as a white, amorphous powder of little or no utility in the production of molding and laminating compositions.

No gelation or precipitation occurred in the solution of this new intercondensation product after standing for several days at room temperature. The resinous syrup is heat-convertible (thermosetting) and is especially suitable for incorporating into a molding (moldable) compound. When the keto-ester is omitted from the above formulation a less plastic, non-curing (heat-non-convertible) resin is obtained.

*Compound I*

All of Resin syrup I was mixed with

| | Parts |
|---|---|
| Alpha flock (alpha cellulose) | 161.0 |
| Zinc stearate (mold lubricant) | 1.2 |

The wet compound was dried at 50° C. for 3 hours. After grinding, the compound was molded at 130° C. under a pressure of 2,000 pounds per square inch for 3 minutes to produce a well-cured, blister-free piece, which showed excellent plastic flow during molding.

The curing of this compound (and of the other keto-ester-modified aminoplasts herein described) may be further accelerated, if desired, by the addition of distinctly acidic substances, or by further intercondensation with curing reactants before mixing with the filler. Numerous examples of acidic bodies that function as latent or active (direct) curing catalysts and examples of curing reactants are given hereafter and in various copending applications of mine. Examples 2, 3 and 4 are illustrative of the production of such faster curing resins and molding compositions utilizing urea, formaldehyde and ethyl acetoacetate in their preparation.

EXAMPLE 2

| | Parts |
|---|---|
| Urea | 57.0 |
| Aqueous ammonia (approximately 28% NH₃) | 6.0 |
| Aqueous formaldehyde (approximately 37.1% HCHO) | 161.0 |
| Sodium hydroxide in 10 parts water | 0.04 |
| Ethyl acetoacetate | 5.5 |

All of the above components were mixed and heated under reflux for 20 minutes. At the end of this time 0.2 part citric acid was added. The syrup was thoroughly mixed with 70 parts alpha flock and 0.4 part zinc stearate. The compound was dried at 70° C. for 2½ hours. When molded at 120° C. for 2 minutes at 2,000 pounds per square inch pressure, the dried compound yielded an article showing excellent plasticity during molding. It was considerably better in this respect than compounds similarly made from resins in which the acetoacetic ester was omitted from the formulation. The piece was thoroughly cured and blister-free. When 0.2 part phthalic anhydride or 0.2 part hydrochloric acid was substituted for the citric acid, similar results were obtained.

EXAMPLE 3

| | Parts |
|---|---|
| Urea | 57.0 |
| Aqueous ammonia (approximately 28% NH₃) | 6.0 |
| Aqueous formaldehyde (approximately 37.1% HCHO) | 160.0 |
| Sodium hydroxide in 10 parts water | 0.04 |
| Ethyl acetoacetate | 5.5 |

The above ingredients were mixed and refluxed for 30 minutes.

Resin syrups produced in accordance with the above formulation then were intercondensed separately with each of the following reagents (curing reactants) to produce self-curing aminoplasts of faster curing rates than given by ethyl acetoacetate alone:

| Curing reactant | Parts | Additional reflux time |
|---|---|---|
| Chloracetamide (monochloracetamide) | 10.0 | 10 minutes. |
| Dichloracetamide | 8.0 | 30 minutes. |
| Trichloracetamide | 1.0 | 8 minutes. |
| Nitrourea | 0.2 | Brought to reflux. |
| Glycine | 0.2 | Do. |
| Chloracetyl urea | 1.0 | 10 minutes. |
| Ethylene diamine monohydrochloride | 0.5 | Brought to reflux. |
| Aminoacetamide hydrochloride | 1.0 | Do. |
| Diethanolamine hydrochloride | 1.0 | Do. |
| Aminoacetonitrile hydrochloride | 0.2 | Do. |
| Chloracetonitrile | 2.0 | 13 minutes. |
| Gamma-chlorbutyronitrile | 4.0 | 10 minutes. |
| Chloral hydrate | 4.0 | Do. |
| Chloracetone | 1.0 | Do. |
| Alpha, alpha prime-dichloracetone | 0.3 | Do. |
| Para-chlorphenyl phenacyl bromide | 2.0 | Do. |
| Phenacyl chloride | 1.0 | Do. |

The above intercondensation products were mixed with 70 parts alpha flock and 0.4 zinc stearate, dried and processed according to conventional methods. The dried molding compounds were molded at 130° C. for 2 minutes at 2,000 pounds per square inch pressure. In all cases blister-free, well-cured molded articles were obtained.

EXAMPLE 4

The following latent catalysts were added to separate batches of resin syrup prepared as described under Example 3:

| Latent catalyst | Parts | Additional reflux time |
|---|---|---|
| Ethyl glycine ester hydrochloride | 0.4 | Brought to reflux. |
| Sodium chloracetate | 1.0 | None. |
| Diethyl chloracetamide | 1.0 | Do. |

The resulting syrups were well mixed with 70 parts alpha flock and 0.4 part zinc stearate, dried and processed in the conventional manner. The dried compound when molded at 130° C. for 2 minutes under a pressure of 2,000 pounds per square inch produced well-cured pieces similar to those obtained as described under Example 3.

EXAMPLE 5

| | Parts |
|---|---|
| Melamine | 120.0 |
| Aqueous ammonia (approximately 28% NH₃) | 6.0 |
| Aqueous formaldehyde (approximately 37.1% HCHO) | 280.0 |
| Sodium hydroxide in 20 parts water | 0.16 |
| Ethyl acetoacetate | 6.5 |

The above reactants were mixed and refluxed for 15 minutes. At the end of this time the resulting syrup was mixed with 133 parts alpha flock and 0.8 part zinc stearate. The wet compound was dried at 67° C. for 2½ hours. After grinding the dried compound, it was molded at 130° C. for 3 minutes under a pressure of 2,000 pounds per square inch. The molded piece was well-cured and blister-free, but was slightly rubbery when hot. This rubbery condition is desirable when molding articles that must be sprung from threaded dies. In other applications, such as in producing massive moldings, a harder compound is desirable. Harder compounds may be produced by methods such as illustrated by Examples 6 and 7.

EXAMPLE 6

The following curing reactants were added to separate batches of resin syrup prepared as described under Example 5 to yield self-curing aminoplasts of accelerated curing rates:

| Curing reactant | Parts | Additional reflux time |
|---|---|---|
| Chloracetamide | 2.0 | 10 minutes. |
| Chloral hydrate | 4.0 | Do. |
| Nitrourea | 0.4 | Do. |
| Glycine | 0.4 | Do. |
| Ethylene diamine monohydrochloride | 1.0 | Do. |
| Diethanolamine hydrochloride | 1.0 | Brought to reflux. |

The resulting intercondensation products were mixed with 133 parts alpha flock and 0.8 part zinc stearate. The wet compounds were dried and processed in the usual manner. After grinding, the compound was molded at 130° C. for 2 minutes at 2,000 pounds per square inch pressure, producing excellent molded pieces that were quite rigid when pulled hot from the mold.

EXAMPLE 7

Separate batches of resin syrup prepared as described under Example 5 were mixed (but not further refluxed) with the following catalysts:

| Catalyst | Type | Parts |
|---|---|---|
| Diethyl chloracetamide | Latent | 2.0 |
| Citric acid | Active | 0.6 |

These syrups were compounded, dried and molded as in Example 6 to give similar molded pieces.

EXAMPLE 8

| | Parts |
|---|---|
| Melamine | 31.5 |
| Thiourea | 57.0 |
| Aqueous ammonia (approximately 28% NH₃) | 6.0 |
| Aqueous formaldehyde (approximately 37.1% NCHO) | 190.0 |
| Sodium hydroxide in 20 parts water | 0.12 |
| Ethyl acetoacetate | 4.0 |

The above ingredients were mixed and refluxed for 15 minutes, followed by the addition of 0.75 part ethyl glycine ester hydrochloride. The resulting syrup was compounded with 94 parts alpha flock and 0.5 part zinc stearate. After drying the compound for 3 hours at 60° C. and grinding the dried compound, a hard, well-cured piece that could be pulled hot from the mold without distortion was obtained by molding for 4 minutes at 130° C. under a pressure of 2,000 pounds per square inch.

EXAMPLE 9

| | Parts |
|---|---|
| Urea | 45.0 |
| Melamine | 31.5 |
| Aqueous formaldehyde (approximately 37.1% HCHO) | 190.0 |
| Aqueous ammonia (approximately 28% NH₃) | 6.0 |
| Sodium hydroxide in 3 parts water | 0.12 |
| Ethyl acetoacetate | 2.5 |

The above components were mixed and refluxed for 15 minutes. The resulting syrup was mixed with 1 part ethyl glycine ester hydrochloride and compounded as in Example 8. The wet compound was dried for 4 hours at 60° C., ground, and molded for 3 minutes at 130° C. and 2,000 pounds per square inch pressure. The molded pieces were similar to those of Example 8 but lighter in color.

EXAMPLE 10

| | Parts |
|---|---|
| Dicyandiamide | 63.0 |
| Melamine | 31.5 |
| Aqueous formaldehyde (approximately 37.1% HCHO) | 240.0 |
| Aqueous ammonia (approximately 28% NH₃) | 6.0 |
| Sodium hydroxide in 5 parts water | 0.2 |
| Ethyl acetoacetate | 5.0 |

The above ingredients were mixed and refluxed for 15 minutes, followed by the addition of 1 part ethyl glycine ester hydrochloride. The resulting resin syrup was compounded as in Example 8 and dried for 5 hours at 60° C. The dried, ground compound was molded at 135° C. for 5 minutes under a pressure of 2,000 pounds per square inch. The compound exhibited high plastic flow during molding and the molded piece when ejected from the hot mold was hard and well-cured.

The ratio of the reactants to each other may be considerably varied but, in general, it is desirable to use at least one mol of an aliphatic aldehyde for each mol of mixed (total) amidogen compound (amino or amido compound) and keto-ester. Good results are obtained by using at least 1½ mols (e. g., from 1¾ to 5 or 6 mols or more) of an aliphatic aldehyde, specifically formaldehyde, for each mol of total amidogen compound and keto-ester. Approximately 2 to 3 mols aliphatic aldehyde per mol total amidogen compound and keto-ester usually give very satisfactory results, particularly from the viewpoint of optimum yield of condensation product per unit cost.

The proportion of the keto-ester may be widely varied as desired or as conditions may require, but in most cases is within the range of 0.01 to 0.35 mol keto-ester per mol amidogen compound. Not exceeding substantially ¼ mol of keto-ester for each mol of amidogen compound often is used. Thus, excellent heat-convertible molding compositions are produced by suitably incorporating a filler into a soluble, fusible resinous condensation product of the components of a mass comprising one mol of urea (or a total of one mol of urea and another amidogen compound, e. g., an aminotriazine such as melamine), at least 1½ mols, advantageously 1¾ to 2½ mols, of an aliphatic aldehyde, specifically formaldehyde, and not exceeding substantially ¼ mol of the herein described keto-ester, specifically an acetoacetic ester. The use of higher amounts of keto-ester is undesirable for many applications because of the greater difficulty in obtaining molded articles of suitable hardness, but may not be objectionable for many applications of the product where a permanently highly-plasticized article is desired. Also, in some cases (particularly when high molecular weight keto-esters, e. g., octadecyl acetoacetate, are used) the keto-ester portion of the resin molecule exceeds on a weight basis the urea portion of the molecule. Consequently, in such cases the inherent characteristics (for example, waxy nature) of the high molecular weight keto-ester predominate in the resin molecule. This may be objectionable in some applications of the molded part, for instance where optimum resistance to the ordinary organic solvents is required.

From the foregoing it will be seen that the particular mol ratio of keto-ester to the other components is dependent somewhat upon the inherent characteristics of the keto-ester and upon the curing, plasticizing and other characteristics desired in the heat-hardenable and heat-hardened resinous condensation products and molding compositions prepared therefrom.

The fundamental resins of this invention may be varied widely by introducing other modifying bodies before, during or after effecting condensation between the primary components. Thus, as modifying agents I may use, for example, monohydric alcohols such as ethyl, propyl, isopropyl, butyl, amyl, etc., alcohols; polyhydric alcohols such as ethylene glycol, diethylene glycol, glycerine, pentaerythritol, trimethylol nitro methane, etc.; monoamides such as formamide, acetamide, stearamide, acryloamides, benzamide, toluene sulfonamide, etc.; polyamides such as adipic diamide, phthalamide, and the like; amines such as ethylene diamine, aniline, phenylene diamine, aminophenols, etc.

The modifying bodies also may take the form of high molecular weight bodies with or without resinous characteristics, for example hydrolyzed wood products, lignin, proteins, protein-aldehyde condensation products, furfural condensation products, phenol-aldehyde condensation products, aniline-aldehyde condensation products, modified or unmodified, saturated or unsaturated polybasic acid-polyhydric alcohol condensation products, sulfonamide-aldehyde resins, water-soluble cellulose derivatives, natural gums and resins such as copal, shellac, rosin, etc., polyvinyl compounds such as polyvinyl alcohol, polyvinyl acetate, polyvinyl acetals, specifically polyvinyl formal, synthetic linear condensation products such as the superpolyamides, etc.

Dyes, pigments and opacifiers may be incorporated into the compositions to alter the visual appearance and the optical properties of the finished product. If needed, mold lubricants may be added to facilitate molding of the heat-convertible molding compositions. Fillers, e. g., alpha cellulose in flock form, asbestos, sand, mica, wood flour, etc., may be added to obtain a wide variety of molding compositions and molded articles adapted to meet particular conditions. Other effect agents also may be added as desired or as conditions may require.

In the preparation of molding compositions, the non-dehydrated or the partially dehydrated condensation products may be compounded with the modifying agents in accordance with procedures well known to those skilled in the plastics art. The wet compositions may be dried in the usual manner at normal (room) temperature or at an elevated temperature in a preheated stream of air or under the influence of reflected heat energy. The dried compound may be densified through the usual processes of working in a Banbury mixer or by rolling, pelleting or other means, followed by grinding and screening to the desired particle size. The molding compositions may be molded at elevated temperatures, preferably between 100° and 150° C., and at suitable pressures. The molding pressures generally range between about 1,000 and 4,000 pounds per square inch.

In addition to their use in molding compositions, the condensation products of this invention may be used as fire retardants, water-repellents, sizings, as impregnants for electrical coils, and for other purposes. Thus, they may be used in these and other applications as described in my copending application Serial No. 288,034, filed August 2, 1939, now Patent No. 2,214,851, issued September 17, 1940, and assigned to the same assignee as the present invention.

What I claim as new and desire to secure by Letters Patent of the United States is:

1. A heat-curable composition comprising a uniform, homogeneous, heat-convertible, resinous reaction product possessing a plasticizing body as a permanent and integral part of the resin molecule, said reaction product being obtained by partially condensing simultaneously ingredients comprising the following components in the stated molar ratios: (1) 1 mol of an amidogen compound, (2) at least 1 mol of formaldehyde and (3) from 0.01 to 0.35 mol of a keto-ester corresponding to the general formula

RCOCH₂COOR' where R and R' represent hydrocarbon radicals.

2. A product comprising the cured composition of claim 1.

3. The homogeneous, internally plasticized, resinous reaction product obtained by simultaneous condensation of ingredients comprising the following components in the stated molar ratios: (1) 1 mol of a urea, (2) at least 1 mol of formaldehyde and (3) from 0.01 to 0.35 mol of an alkyl acetoacetate.

4. A resinous composition possessing a plasticizing body as a permanent and integral part of the resin molecule and in its soluble, fusible form being convertible under heat to an insoluble, infusible state in the absence of an added curing agent, said composition comprising the resinous product of simultaneous condensation of ingredients comprising the following components in the stated molar ratios: (1) 1 mol of urea, (2) from 0.01 to 0.35 mol ethyl acetoacetate and (3) from 1½ to 6 mols formaldehyde for each mol of the sum of the reactants of (1) and (2).

5. The homogeneous, internally plasticized, resinous reaction product obtained by simultaneous condensation of ingredients comprising the following components in the stated molar ratios: (1) 1 mol of an aminotriazine, (2) at least 1 mol of formaldehyde and (3) from 0.01 to 0.35 mol of an alkyl acetoacetate.

6. A resinous composition possessing a plasticizing body as a permanent and integral part of the resin molecule and in its soluble, fusible form being convertible under heat to an insoluble, infusible state in the absence of an added curing agent, said composition comprising the resinous product of simultaneous condensation of ingredients comprising the following components in the stated molar ratios: (1) 1 mol of melamine, (2) from 0.01 to 0.35 mol ethyl acetoacetate and (3) from 1½ to 6 mols formaldehyde for each mol of the sum of the reactants of (1) and (2).

7. A resinous composition comprising the condensation product obtained by simultaneous reaction of ingredients comprising the following components in the stated molar ratios: (1) a total of 1 mol of urea and melamine, (2) from 0.01 to 0.35 mol ethyl acetoacetate and (3) from 1½ to 6 mols formaldehyde for each mol of the sum of the reactants of (1) and (2), said condensation product of its soluble, fusible form being convertible under heat to an insoluble, infusible state in the absence of an added curing agent, and said ethyl acetoacetate internally plasticizing the said condensation product and constituting a permanent and integral part of the resin molecule.

8. A thermosetting molding composition comprising a filler and the homogeneous, internally plasticized, heat-convertible, resinous reaction product obtained by partially condensing simultaneously, at least initially under alkaline conditions, ingredients comprising the following components in the stated molar ratios: (1) 1 mol urea, (2) from 1½ to 2½ mols formaldehyde and (3) from 0.01 to 0.25 mol ethyl acetoacetate, said ethyl acetoacetate internally plasticizing the said reaction product.

9. An article of manufacture comprising the thermoset molding composition of claim 8.

10. The homogeneous, internally plasticized, resinous reaction product obtained by simultaneous condensation of ingredients comprising the following components in the stated mol ratios: (1) 1 mol urea, (2) from 1½ to 2½ mols formaldehyde and (3) from 0.01 to 0.25 mol ethyl acetoacetate, said condensation reaction being initiated under alkaline conditions due to the presence of a nitrogen-containing compound selected from the class consisting of ammonia, monoamines and diamines, and said reaction product in its soluble, fusible form being convertible under heat to an insoluble, infusible state in the absence of an added curing agent.

11. The method of preparing new resinous materials that are internally plasticized and that in soluble, fusible form are convertible under heat to an insoluble, infusible state in the absence of an added curing agent, said method comprising effecting simultaneous reaction under heat between ingredients comprising the following components in the stated molar ratios: (1) 1 mol of an amidogen compound, (2) at least 1 mol of formaldehyde and (3) from 0.01 to 0.35 mol of a keto-ester corresponding to the general formula $RCOCH_2COOR'$, where R and R' represent hydrocarbon radicals.

GAETANO F. D'ALELIO.

CERTIFICATE OF CORRECTION.

Patent No. 2,325,376.   July 27, 1943.

GAETANO F. D'ALELIO.

It is hereby certified that error appears in the printed specification of the above numbered patent requiring correction as follows: Page 1, first column, line 18, for "animoplasts" read --aminoplasts--; page 2, first column, line 31, strike out "creatinine," page 4, first column, line 73, Example 8, for "NCHO" read --HCHO--; page 6, first column, line 23, for "of" before "its" read --in--; and that the said Letters Patent should be read with this correction therein that the same may conform to the record of the case in the Patent Office.

Signed and sealed this 12th day of October, A. D. 1943.

(Seal)

Henry Van Arsdale,
Acting Commissioner of Patent.